(12) United States Patent
Keller et al.

(10) Patent No.: US 9,525,743 B2
(45) Date of Patent: Dec. 20, 2016

(54) SYSTEM AND METHOD FOR PREDICTIVE LIVE INTERACTION OFFERING AND HOSTING

(71) Applicant: INTERACTIVE INTELLEGENCE, INC., Indianapolis, IN (US)

(72) Inventors: Jonathan M. Keller, Lafayette, IN (US); Gregory P. Cunningham, Zionsville, IN (US)

(73) Assignee: INTERACTIVE INTELLIGENCE GROUP, INC., Indianapolis, IN (US)

( * ) Notice: Subject to any disclaimer, the term of this patent is extended or adjusted under 35 U.S.C. 154(b) by 529 days.

(21) Appl. No.: 13/942,784

(22) Filed: Jul. 16, 2013

(65) Prior Publication Data

US 2015/0026254 A1    Jan. 22, 2015

(51) Int. Cl.
    *H04L 29/08*    (2006.01)

(52) U.S. Cl.
    CPC .............. *H04L 67/22* (2013.01); *H04L 67/30* (2013.01); *H04L 67/325* (2013.01)

(58) Field of Classification Search
    CPC ......... H04L 67/22; H04L 67/30; H04L 67/325
    USPC ....................................................... 709/204
    See application file for complete search history.

(56) References Cited

U.S. PATENT DOCUMENTS

| | | | |
|---|---|---|---|
| 5,815,566 A | 9/1998 | Ramot et al. | |
| 6,973,176 B1 | 12/2005 | Chism et al. | |
| 7,406,515 B1 | 7/2008 | Joyce et al. | |
| 7,693,734 B2 * | 4/2010 | Christenson | G06Q 10/1095 370/261 |
| 8,121,953 B1 * | 2/2012 | Orttung | G06Q 10/1095 705/35 |
| 8,438,235 B2 * | 5/2013 | Shaffer | H04L 12/581 709/206 |
| 8,548,918 B1 * | 10/2013 | Amidon | G06Q 20/123 705/50 |
| 8,934,612 B2 * | 1/2015 | Ristock | H04M 3/567 348/14.08 |
| 8,996,639 B1 * | 3/2015 | Faaborg | H04L 51/02 455/412.1 |
| 2003/0231647 A1 | 12/2003 | Petrovykh | |
| 2004/0083195 A1 | 4/2004 | McCord et al. | |
| 2004/0184593 A1 | 9/2004 | Elsey et al. | |

(Continued)

FOREIGN PATENT DOCUMENTS

| | | | | |
|---|---|---|---|---|
| CA | 2522555 A1 * | 4/2006 | ........... | H04L 12/581 |
| EP | 1653697 A1 * | 5/2006 | ........... | H04L 12/581 |
| JP | 2006141004 A * | 6/2006 | | |

OTHER PUBLICATIONS

International Search Report issued in related international application PCT/US 13/50593 on Apr. 9, 2014 (filing date Jul. 16, 2013.

*Primary Examiner* — Kostas Katsikis

(57) ABSTRACT

A system and method are presented for predictive live interaction offering and hosting. A mechanism may be provided for controlling outstanding offerings, or invitations, of communications with users through points of service. Offerings may include a live chat or a telephone callback request. In one embodiment, offerings may be optimized by analyzing factors such as agent history to predict when and how many agents will be available. Calculations may be continuously performed as invitations are accepted, declined, timed out, etc., to make certain more offers than can be handled are not extended.

12 Claims, 5 Drawing Sheets

(56) References Cited

U.S. PATENT DOCUMENTS

| | | |
|---|---|---|
| 2005/0002515 A1 | 1/2005 | Mewhinney et al. |
| 2005/0228723 A1 | 10/2005 | Malik |
| 2006/0026253 A1* | 2/2006 | Kessen ............... G06Q 10/107 709/207 |
| 2006/0116918 A1 | 6/2006 | Flora et al. |
| 2006/0147026 A1 | 7/2006 | Statham et al. |
| 2006/0153173 A1 | 7/2006 | Beck et al. |
| 2006/0165066 A1 | 7/2006 | Campbell et al. |
| 2007/0015518 A1 | 1/2007 | Winter et al. |
| 2008/0002820 A1* | 1/2008 | Shtiegman ........ H04L 29/06027 379/211.02 |
| 2008/0301230 A1* | 12/2008 | Li ......................... H04L 12/581 709/204 |
| 2010/0111288 A1 | 5/2010 | Afzal et al. |
| 2010/0121919 A1* | 5/2010 | Hepworth ............... G06Q 10/10 709/204 |
| 2010/0138534 A1 | 6/2010 | Mutnuru et al. |
| 2010/0205541 A1* | 8/2010 | Rapaport ............... G06Q 10/10 715/753 |
| 2010/0303225 A1* | 12/2010 | Shashkov ........... H04M 3/5158 379/265.11 |
| 2011/0153375 A1 | 6/2011 | Weinstock et al. |
| 2011/0158398 A1* | 6/2011 | Kannan ................ H04L 12/1827 379/265.09 |
| 2011/0286444 A1 | 11/2011 | Petrovykh |
| 2012/0116830 A1 | 5/2012 | Loring et al. |
| 2012/0213356 A1 | 8/2012 | Shashkov et al. |
| 2012/0321070 A1 | 12/2012 | Smith et al. |
| 2013/0051546 A1 | 2/2013 | Fried et al. |
| 2013/0268468 A1* | 10/2013 | Vijayaraghavan ... G06N 99/005 706/12 |
| 2013/0282430 A1* | 10/2013 | Kannan .................. G06Q 30/02 705/7.29 |
| 2014/0164525 A1* | 6/2014 | Malik .................. G06Q 10/109 709/206 |
| 2014/0188541 A1* | 7/2014 | Goldsmith ............. G06Q 10/06 705/7.19 |
| 2014/0278675 A1* | 9/2014 | Deluca ............... G06Q 10/1095 705/7.19 |
| 2014/0282016 A1* | 9/2014 | Hosier, Jr. ................ H04W 4/08 715/733 |

* cited by examiner

SYSTEM AND METHOD FOR PREDICTIVE LIVE INTERACTION OFFERING AND HOSTING

BACKGROUND

The present invention generally relates to telecommunications systems and methods. More particularly, the present invention pertains to handling invitations of communications with users through points of service.

SUMMARY

A system and method are presented for predictive live interaction offering and hosting. A mechanism may be provided for controlling outstanding offerings, or invitations, of communications with users through points of service. Offerings may include a live chat or a telephone callback request. In one embodiment, invitations may be optimized by analyzing factors such as agent history to predict when and how many agents will be available. Calculations may be continuously performed as offers are accepted, declined, timed out, etc., to make certain more offers than can be handled are not extended.

In an embodiment, a computerized method for controlling invitations to users through points of service is presented, comprising the steps of: receiving a request for invitation from each of a plurality of users at a web server; determining a level of confidence, the level of confidence being based at least in part on a plurality of agent statuses associated with a plurality of agents and a predicted duration of availability for each of the plurality of agents; determining an optimal number of invitations to one or more of the plurality of users based at least in part on a chat acceptance rate and the level of confidence; determining an accepted limit based at least in part on the level of confidence; selecting one or more of the plurality of users based on the optimal number of invitations; and transmitting, with the web server, an invitation to each of the selected users.

In another embodiment, a computerized method for controlling invitations to users through points of service is presented, comprising the steps of: predicting a number of free agents at a point in the future based at least in part on agent statuses associated with a plurality of agents, chat acceptance rate, and predicted duration of agent availability for each of the plurality of agents; determining an optimal number of invitations to extend to a plurality of users, the optimal number being a multiple of said number of free agents; reserving one or more agents of the plurality of agents based at least in part on the optimal number; and distributing invitations to the plurality of users based on the optimal number.

In another embodiment, a method for controlling invitations to users through points of service is presented, comprising the steps of: computing a number of predicted available agents based at least in part on an expected acceptance rate, a maximum time limit for an invitation to remain available, and agent availability; allocating a number of invitation tokens; returning a live invitation to a user via a method of communication; and determining if a user has accepted an invitation.

DETAILED DESCRIPTION

Figure 1:
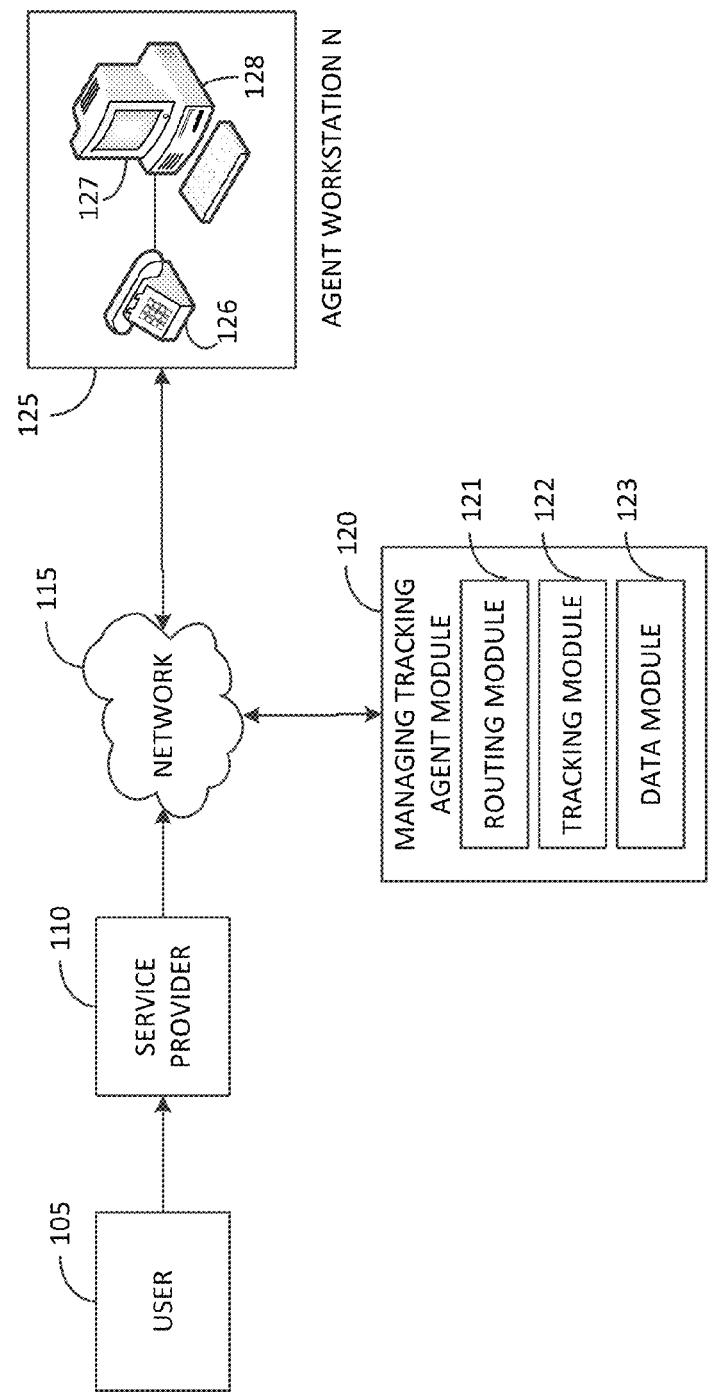
FIG. 1 is a diagram illustrating the basic components of an embodiment of the system.

For the purposes of promoting an understanding of the principles of the invention, reference will now be made to the embodiment illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

Many web sites and products, for example, have implemented features that will offer a live chat or a telephone callback request if a potential user, or customer, is viewing or accessing content on their point of service. A point of service may include, but not be limited to, a web site or a mobile application. An offer of a live chat may only occur if an agent is available immediately. The intention of this feature is to entice a potential customer or a user into direct human interaction by the immediacy of an agent being available. However, a free agent may be offered to more than person. If more than one user is at the point of service, but only one agent is available, offering an interaction to more than one user increases the probability that more than one will accept. At least one of the users may then be without an agent and waiting, which may be referred to as an "abandon".

In at least one embodiment, a mechanism is provided for controlling outstanding invitations, optimizing the number of invitations, and monitoring the allowable limits of offer acceptance. Mechanisms may control outstanding offerings, or invitations, in several different ways. In at least one embodiment, one or more offerings may be allowed that fit a specific interaction profile. These pending offerings may be referred to as "Reservations". A limit to the number of offerings that are accepted may also be provided. The duration for an offer to remain valid may also be set.

In at least one embodiment, the number of offerings may be optimized. For example, an agent answer history may be used to predict when agents will be free. A certain level of confidence may be determined that, for an amount of time, a certain number of agents may be available. For example, if for the next 10 seconds, it is confident that there are at least 5 agents available with a 60% chat acceptance rate, then 8 invitations may be extended to users. It may also be predicted how long the agents will be free. Predictions may be made by re-evaluating every agent's change of status, such as "available", "busy", etc. Predictions may be based on a configurable time window to reduce the computation load of the prediction. The answer history may also be used to predict how many offers will be answered based on past history. A predictive dialer, such as Interactive Intelligence's Interaction Dialer® may be used to make such predictions. Aggressiveness factors within a predictive dialer may be utilized to factor in the allowable number of invitations to be answered. Abandon limit factors may also be included that are used in a predictive dialer to decrease the aggressiveness of offerings to achieve desired abandon limits either by desire, such as manually by the agent, or as required by current or future regulation. Predictions may also be made using categorization of calls that allow incorporation of agent skills or other customer subdivisions of the interactions into any statistical grouping of customers' choice.

In at least one embodiment, when offered interactions are accepted, a check is performed to determine if the accepted limit is reached. If the accepted limit has been reached, then the outstanding invitations are revoked. A re-calculation may also be performed to determine if offers can continue to be made based on current agents and future predictions.

FIG. 1 is a diagram illustrating the basic components in one embodiment of a system, indicated generally at 100. The basic components of the system 100 may include: a User 105, a Service Provider 110, a Network 115, and a Managing Tracking Agent Module 120 which may comprise a Routing Module 121, a Tracking Module 122, and a Data Module 123. System 100 may also include a plurality of Agent Workstations 125.

A User 105 may comprise a potential customer who is accessing a point of service. For example, a user 105 may be browsing on a website on the Internet and be identified as a potential customer to be made an invitation for communication. Such an offer may comprise a chat, instant message, telephone call or a callback request. A telephone call may be of the "click to call" type, where a User 105 is immediately called by the system and placed in queue to talk to an agent. In a situation where a User 105 does not have time to talk at the moment or an agent is unavailable, a callback may be desired. Identification of a User 105 as a potential customer may be made by monitoring the navigation of the User 105 on a webpage. For example, if a User 105 is clicking on links within a page to learn more about a product or exploring the site, they may be identified as a potential customer. If a page is opened and no activity occurs, for example, this behavior may not be indicative of a potential customer.

A Service Provider 110 may function as a gateway for a device. For example, the Service Provider 110 may comprise a web server, a User Interface Application between public users and services, or any type of customer relations application on any networkable computing device, either mobile or non-mobile. Such an example may include Interactive Intelligence, Inc.'s, Interaction Mobilizer product.

The network 115 may be in the form of a Local Area Network (LAN), Municipal Area Network (MAN), Wide Area Network (WAN), such as the Internet, a combination of these, or such other network arrangement as would occur to those skilled in the art. The operating logic of system 100 may be embodied in signals transmitted over network 115, in programming instructions, dedicated hardware, or a combination of these. The network 115 may, in one embodiment, regulate the User's 105 view of the process. The Network 115 may also provide communication between the Service Provider 110 and the Server 120.

A Managing Tracking Agent Module 120 may comprise a server that the client communication software is stored on. Such an example may include the Interactive Intelligence's Customer Interaction Center® or Cisco CallManager. The Managing Tracking Agent Module 120 may be comprised of modules such as the Routing Module 121, a Tracking Module 122, and a Data Module 123. The Routing Module 121 may route an agent interaction to the user. The Tracking User Module 122 may track users that are available or receptive to receive an offer. The Data Module 123 may be responsible for providing predictive statistics and/or processing future predictive data of agent availability.

An agent workstation 125 may include a work station computer 128 coupled to a display 127. Workstation computers 128 may be of the same type, or a heterogeneous combination of different computer devices. Likewise, displays 127 may be of the same type or a heterogeneous combination of different visual devices. It should be understood that while one work station 125 is described in the illustrative embodiment, more may be utilized. Contact center applications of system 100 typically include many more workstations of this type at one or more physical locations, but only one is illustrated in FIG. 1 to preserve clarity.

A digital telephone 126 may be associated with an Agent Workstation 125. Additionally, a digital telephone 126 may be integrated into the Agent Computer 128 and/or implemented in software. It should be understood that a digital telephone 126, which is capable of being directly connected to network 115, may be in the form of a handset, headset, or other arrangement as would occur to those skilled in the art. It shall be further understood that the connection from computer network 115 to an agent workstation 125 can be made first to the associated workstation telephone, then from the workstation telephone to the workstation computer by way of a pass through connection on the workstation telephone. Alternatively, two connections from the network can be made, one to the workstation telephone and one to the workstation computer. Although not shown to preserve clarity, an agent workstation 125 may also include one or more operator input devices such as a keyboard, mouse, track ball, light pen, and/or microtelecommunicator, to name just a few representative examples. Additionally, besides display 127, one or more other output devices may be included such as a loudspeaker(s) and/or a printer.

Figure 2:
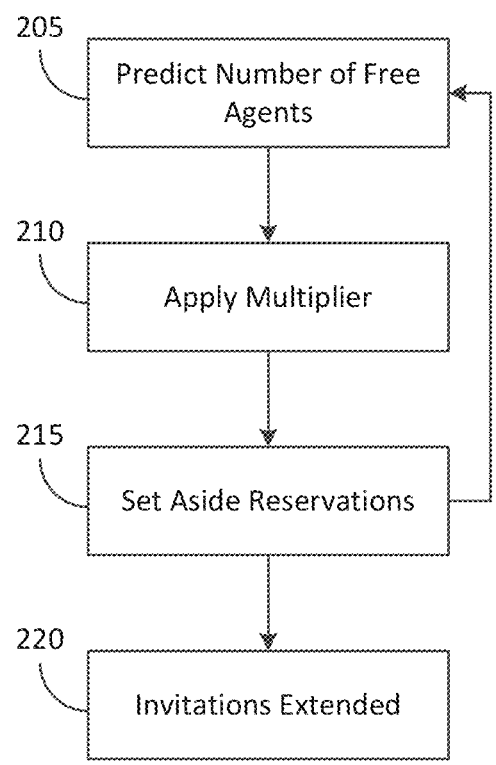
FIG. 2 is a flowchart illustrating a process of an embodiment.

FIG. 2 is a flowchart illustrating an embodiment of the process. The process 200 may be operative in the system 100 (FIG. 1). In one embodiment, the process 200 may occur concurrently with process 300 as described in FIG. 3. The process 200 loops in a continuous cycle which may be based on a time period, the assignment of an interaction, or any other event that may require a new prediction to be made. The process 200 may be triggered at any point that a user's interactions with a point of service may be monitored. Any system that sends information about user navigation and the appropriate requests may trigger the logic. Such information from process 300 may be used to triggers operations within process 200. Other examples of triggers may include but not be limited to: agent status, agent login and logout, number of interactions active with each agent, time each agent is active with the interactions, after call work being performed, an auxiliary work state, other work agents might be performing, compliance information from work force management, future schedule changes from workforce management systems, and forecasts of current and future interaction activity.

In operation 205, the number of free agents is predicted. For example, in one embodiment agent answer history may be used to predict when agents will be free and for the duration of time they will be free. The length of time that an agent is free may be re-evaluated with every agent change of state. For example, if an agent is busy, the amount of time that the agent remains in this state is monitored and used for evaluation along with other changes in state to determine how long an agent may be free. In another embodiment, a set period may be monitored for agent statuses to determine the length of time an agent is free. Any sort of prediction mechanism may be used, such as a predictive dialer in a call center, which may use statistics regarding each agent's passage through the various stages of an active call. Control is passed to operation 210 and the process 200 continues.

In operation 210, a multiplier is applied. For example, the acceptance rate of a user accepting an offer may have a multiplier to determine how many or how few invitations to make based on agent availability. Control is passed to operation 215 and the process 200 continues.

In operation 215, reservations are set aside. For example, a number of reservations may be set aside such as some number of 'x' agents to fill a number 'y' of offers to distribute. Control is passed to operation 220 and the process 200 continues.

In operation 220, invitations are extended. For example, an offer is delivered to a user at the point of service. A prompt or dialog may ask a user browsing a website if they want to immediately connect to a company representative via a Chat, Instant Message, or telephone call. The process 200 ends.

Figure 3:
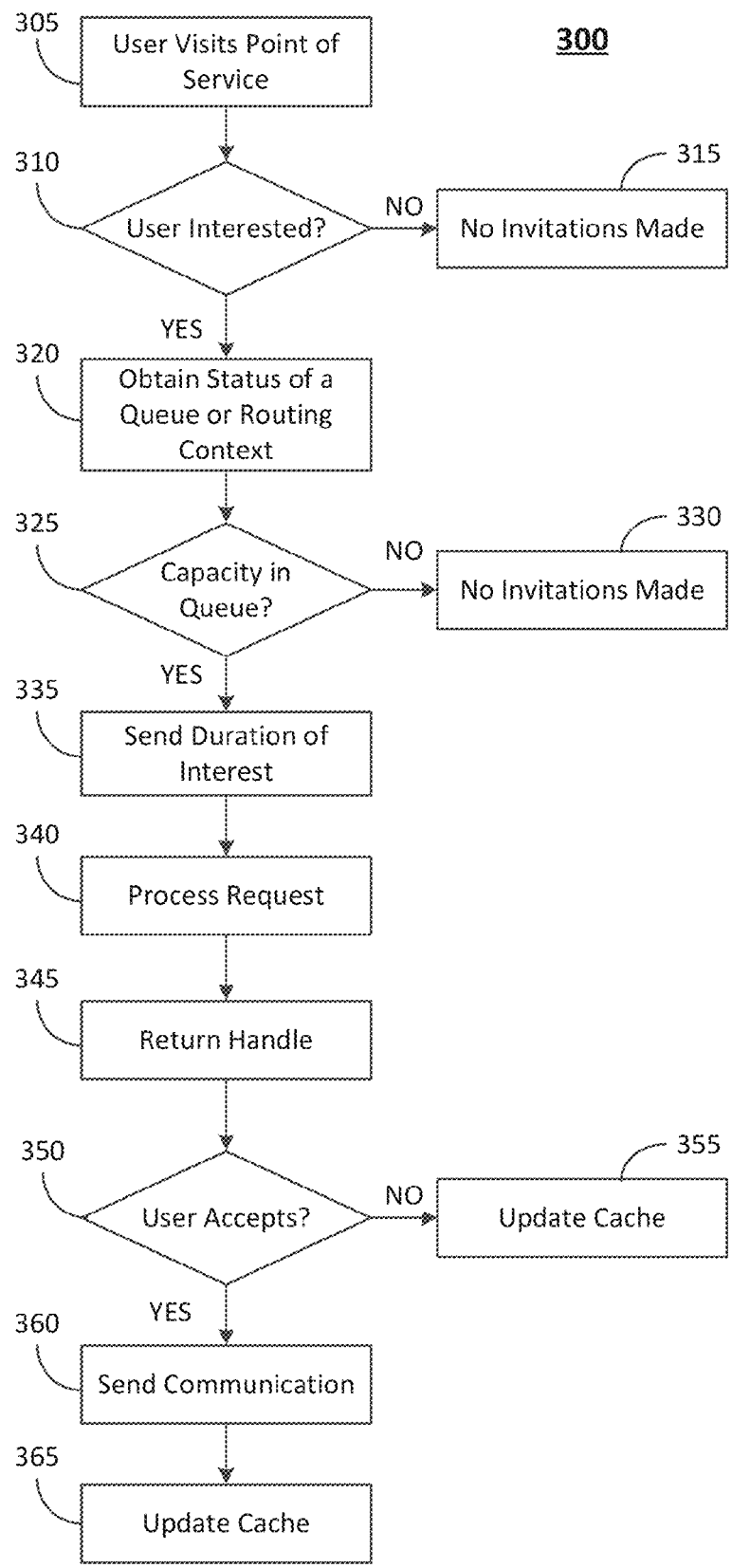
FIG. 3 is a flowchart illustrating a process of an embodiment.

FIG. 3 is a flowchart illustrating an embodiment of the process. The process 300 may be operative in the system 100 (FIG. 1). The process 200 overlaps with the process 300. The process 300 may utilize the information from the back-end agent predictions and triggers the operations in process 200. The process 200 may loop in a continuous cycle each time an assignment of an offer is made. Process 300 then cycles if is determined that offers are to be distributed.

In operation 305, a user visits a point of service. For example, a user may navigate to a webpage and click on links on the webpage. By clicking on links, interest in a product, service, or more information, may be exhibited. Control is passed to operation 310 and the process 300 continues.

In operation 310, it is determined whether or not the user is interested. If it is determined that a user is interested, control is passed to operation 320 and the process 300 continues. If it is determined that a user is not interested, control is passed to operation 315 and the process 300 continues.

The determination in operation 310 may be based on any suitable criteria. For example, it may be determined if a user is interested based on the number of links selected on a webpage. A user may select several links on a page if they are interested in learning more information about a particular product or service. Users who are not interested, may simply leave the page. In another example, a user may navigate to a web page and pause for a time period. This pause may be construed to indicate that the user needs assistance and may trigger an invitation. Other factors may be considered, such as the time spent on a webpage.

In operation 315, no invitations are made and the process 300 ends.

In operation 320, the status of a queue or routing context is obtained. For example, the web processor polls the server to obtain the status of a queue or routing context of interest. In at least one embodiment, the routing context or queue may be of interest because it has been recently queried. Control is passed to operation 325 and the process 300 continues.

In operation 325, it is determined whether or not the queue has capacity. If it is determined that the queue has capacity, control is passed to operation 335 and the process 300 continues. If it is determined that the queue does not have capacity, control is passed to operation 330 and the process 300 continues.

The determination in operation 325 may be based on any suitable criteria. For example, factors may be considered such as the number of acceptances, how many agents are free, etc. The information is based on a statistical calculation to determine how many offers to hand out and if the queue has the capacity to handle these. Such a statistical calculation may be made using those known in the art. For example, the acceptance rate prediction algorithms generally used in automatic dialing systems may be used. Aggressiveness calculations may also be used to determine the risk multiplier for the risk of abandoned calls versus offers.

In operation 330, no invitations are made and the process 300 ends.

In operation 335, the duration of interest is sent. For example, the processor may send the "duration" of interest so that the predictive algorithm may know the span of time it is covering. A "duration" of interest may comprise how frequently the system expects to update the results. Control is passed to operation 340 and the process 300 continues.

In operation 340, the request is processed and control is passed to operation 345. The process 300 continues.

In operation 345, a handle is returned. For example, the processing operation may return "HowManyChatsToOffer", "HowManyChatsToAccept", "HowLongToOffer", etc., from a cache. In another embodiment, calls may be offered instead of chat. If a call is offered, then a power-dial may occur from the dialer. The handler may then return "How-ManyCallsToOffer" or "HowManyCallsToAccept" if a call is offered. In at least one embodiment, tokens may be used. For a current query for the status of a queue or future requests up to the next polling time indicate that offers may be made to no more than "ToOffer" less the number of "HasAccepted" while "HasAccepted" is less than or equal to "ToAccept" for each media type.

If "HowMany*ToOffer" is greater than zero, and "HowMany*ToAccept" is greater than zero, then a token may be allocated to represent any outstanding invitations for a media type. The "ToOffer" handle from the call or chat may be decremented that are non-zero. For any allocated tokens, the Boolean operator "true" or "false" may be returned for the "CallOffer" or "ChatOffer" in the web queue status, which may indicate whether the user is entitled to a chat or to a call, or both. For example, "CallOffer=false, ChatOffer=true" may indicate a chat offering while "CallOffer=true, ChatOffer=false" may indicate a call offering.

A wait may then occur for the web user up to "HowLongToOffer". If a response of "AcceptCall" or "AcceptChat" is returned as true, then handle "HowMany*Accept" of the call or chat that was accepted may be decremented. For any unused tokens, the matching "HowMany*Offer" is incremented and the token is disposed of. Tokens may be unused due to timeout, an offer rejection, or use of only the call or the chat. Control is passed to operation 350 and the process 300 continues.

In operation 350 it is determined whether or not the customer accepts a communication. If it is determined that a customer accepts the communication, control is passed to operation 360 and the process 300 continues. If it is determined that a customer does not accept the communication, control is passed to operation 355 and the process 300 continues.

The determination in operation 350 may be made based on any suitable criteria. For example, a customer may trigger acceptance by opting to receive a communication such as a call or chat from an agent. Declining an invitation may be done by the customer manually, or if may be done automatically by the system. A time out may be triggered if a customer does not decline or accept an offer within a specified period of time. This may be a predetermined period lasting seconds or longer, depending on the desired limits. The system may treat a time out the same as a decline and decrease the pending offers count. Decreasing the pending offers count may allow the system to make more offers.

In operation 355, the cache updates the state of the handle and alters a number of offerings and a number to accept. For example, when the web processor receives the results, the cache is updated with the value of the handle such as "HowManyCallsToOffer" or "HowManyChatsToAccept". An offer is then freed up for redistribution. In one embodiment, a check is performed to determine if the accepted limit of interactions have been accepted. If the accepted limit has been reached, the any outstanding offers may be revoked early in order to avoid having more offers accepted than available agents. The process 300 ends.

In operation 360, a communication is sent. A communication may be sent in a manner specified by the user. For example, a chat may be performed through the User Interface or alternatively, a customer may elect to receive a telephone call from an agent. Control is passed to operation 365 and the process 300 continues.

In operation 365, the cache updates the state of the handle and alters a number of offerings and a number to accept. For example, when the web processor receives the results, the cache is updated with the value of the handle such as "HowManyCallsToOffer" or "HowManyChatsToAccept", for example. A value may vary depending on the implantation. An offer may then be freed for re-distribution. The process 300 ends.

Figure 4:
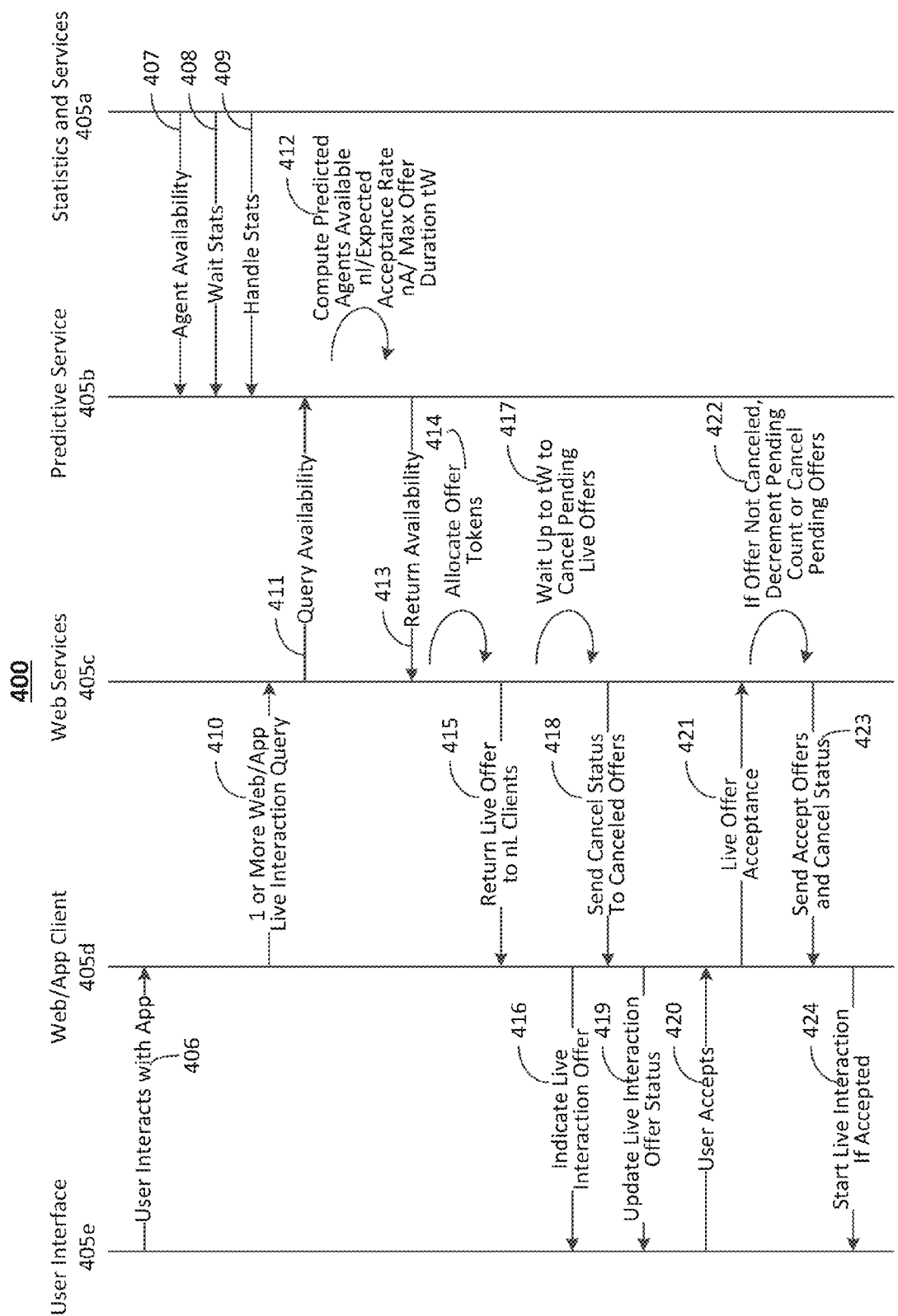
FIG. 4 is a sequence diagram illustrating an embodiment of acceptance of an invitation.

FIG. 4 is a sequence diagram illustrating an embodiment of the process with the acceptance of an offer. The vertical axes correspond to Statistics and Services 405a, Predictive Service 405b, Web Services 405c, Web/App Client 405d, and the User Interface 405e. Actions in the User Interface may trigger the need or desire to offer a live interaction 406. Statistics and Services 405a may send information to the Predictive Service 405b, such as the agent availability 407, wait time statistics 408, and agent handle time statistics 409. The Statistics and Services 405a may be a constant data stream occurring in real time. The Web/App Client 405d may send information from at least one web/app live interaction query 410 to the web services 405c. The Predictive Service then receives availability information 411 from the web services 405c. The Predictive Service 405b may compute the predicted number of agents that are expected to be available 412. The computation, in at least one embodiment, may be performed using an expected acceptance rate, the predicted number of agents available, and/or a maximum time limit for an offer duration. The Predictive Service then returns agent availability 413 to the web services 405c. Offer Tokens may be allocated 414. The Web Services 405c may return a live offer to chat or call to the number of live agents 415 to the Web/App Client 405d. A live interaction invitation 416 is indicated to the User Interface 405e.

A timeout may occur in which pending live offers may be canceled. The Web Services 405c may wait up to the time limit for the maximum offer duration to cancel such pending live offers 417. A cancel status 418 is then returned to the Web/App Client 405d. The Live Interaction Offer status 419 is then updated.

If a User accepts 420 an offer, then the web/app client 405d may indicate such acceptance of the live offer 421 to the Web services. If such an offer is not canceled, then the pending offer count may be decremented or pending offers may be cancelled 422. Web Services 405c sends accepted offers and cancelled offer status 423 to the web/app client 405d. A live interaction may be initiated if it has been accepted 424.

Figure 5:
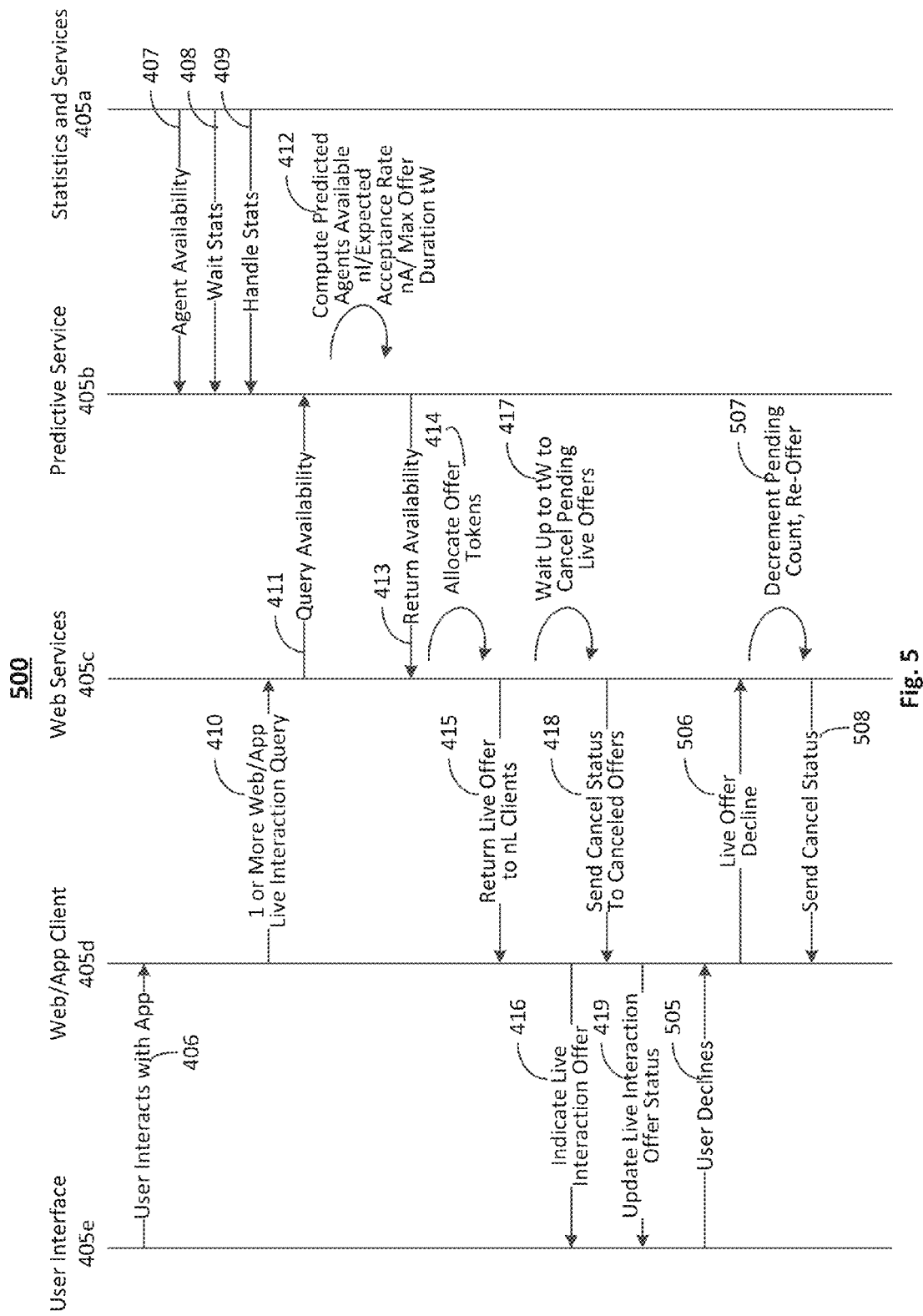
FIG. 5 is a sequence diagram illustrating an embodiment of an invitation decline.

FIG. 5 is a sequence diagram illustrating an embodiment of the process with the decline of an offer. The steps are similar to those of FIG. 4, except that the user declines an offer 505. The Web/App Client 405d may indicate to Web services 405c that the live offer has been declined 506. The system may decrement the pending offer count and offer again any free offers 507. A cancel status 508 is sent to the web/app client 405d. Alternatively, instead of a decline by a user, a time-out may occur which may be treated in a similar manner. A time out may be triggered if a customer does not decline or accept an offer within a specified period of time. The system may decrease the pending offer count in a similar manner as step 507 and perform a re-offer. In another embodiment, if an open offer can be managed by the system without having to expire said offer, the original offer may also be extended.

While the invention has been illustrated and described in detail in the drawings and foregoing description, the same is to be considered as illustrative and not restrictive in character, it being understood that only the preferred embodiment has been shown and described and that all equivalents, changes, and modifications that come within the spirit of the invention as described herein and/or by the following claims are desired to be protected.

Hence, the proper scope of the present invention should be determined only by the broadest interpretation of the appended claims so as to encompass all such modifications as well as all relationships equivalent to those illustrated in the drawings and described in the specification.

The invention claimed is:

1. A computerized method for controlling invitations to users through points of service comprising the steps of:
   a. receiving a request for invitation from each of a plurality of users at a web server;
   b. determining a level of confidence, the level of confidence being based at least in part on a plurality of agent statuses associated with a plurality of agents and a predicted duration of availability for each of the plurality of agents;
   c. determining an optimal number of invitations to one or more of the plurality of users based at least in part on a chat acceptance rate and the level of confidence;
   d. determining an accepted limit based at least in part on the level of confidence;
   e. selecting one or more of the plurality of users based on the optimal number of invitations; and
   f. transmitting, with the web server, an invitation to each of the selected users; wherein the invitation is valid for a set duration of time.

2. The method of claim 1, wherein steps (b) and (c) are guided by the interactions of step (a).

3. The method of claim 1, further comprising:
   expiring each invitation at the duration of time in the event said invitation has not been accepted.

4. The method of claim 1, wherein the level of confidence is based at least in part on agent availability, agent availability being determined by examining at least one agent call history.

5. The method of claim 4 wherein the at least one agent history is examined by a predictive dialer.

6. The method of claim 3, wherein the steps are continuously performed over a time period.

7. The method of claim 6, wherein the time period is based on agent status changes.

8. The method of claim 6, wherein the time period is based on increments of time.

9. The method of claim 5, wherein aggressiveness factors are used within said predictive dialer to factor in an allowable number of invitations to be made in making the predicted duration of availability.

10. The method of claim 5, wherein the optimal number of invitations is based at least in part on abandon limit factors.

11. The method of claim 5, wherein the predicted duration of availability is based at least in part on a categorization of calls and an agent skill associated with each of the plurality of agents.

12. The method of claim 1, further comprising:
   a. revoking one or more invitations upon receiving an indication that a number of invitations has been accepted by the selected users equal to the accepted limits; and
   b. recalculating the accepted limit and the level of confidence.

* * * * *